US008374629B2

(12) United States Patent
Yin (10) Patent No.: US 8,374,629 B2
(45) Date of Patent: Feb. 12, 2013

(54) MOBILITY MANAGEMENT METHOD, RELEVANT DEVICES, AND COMMUNICATION SYSTEM

(75) Inventor: Yu Yin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 13/073,568

(22) Filed: Mar. 28, 2011

(65) Prior Publication Data

US 2011/0171975 A1 Jul. 14, 2011

Related U.S. Application Data

(63) Continuation of application No. PCT/CN2009/074065, filed on Sep. 21, 2009.

(30) Foreign Application Priority Data

Sep. 27, 2008 (CN) .......................... 2008 1 0161460

(51) Int. Cl.
*H04W 24/00* (2009.01)
(52) U.S. Cl. ................ 455/456.1; 455/456.2; 455/435.1
(58) Field of Classification Search .................. None
See application file for complete search history.

(56) References Cited

U.S. PATENT DOCUMENTS

| 6,345,186 | B1 | 2/2002 | Schultz et al. | |
|---|---|---|---|---|
| 2002/0138195 | A1 | 9/2002 | Watanabe | |
| 2003/0235165 | A1 | 12/2003 | Wang | |
| 2004/0235496 | A1 | 11/2004 | Hiyama et al. | |
| 2008/0146237 | A1 | 6/2008 | Shikama et al. | |
| 2008/0194271 | A1* | 8/2008 | Bedekar et al. | ............ 455/456.2 |
| 2011/0034212 | A1 | 2/2011 | Gavrilovich | |

FOREIGN PATENT DOCUMENTS

| CN | 1335024 | A | 2/2002 |
|---|---|---|---|
| CN | 1477887 | A | 2/2004 |
| CN | 101203044 | A | 6/2008 |
| EP | 1460869 | A1 | 9/2004 |
| EP | 1860904 | A1 | 11/2007 |
| JP | 2002152804 | A | 5/2002 |
| JP | 2004229078 | A | 8/2004 |
| JP | 2006157957 | A | 6/2006 |
| WO | WO 2007137703 | A1 | 12/2007 |

OTHER PUBLICATIONS

Written Opinion of the International Searching Authority issued in corresponding PCT Patent Application No. PCT/CN2009/074065, mailed Dec. 31, 2009.
International Search Report issued in corresponding PCT Patent Application No. PCT/CN2009/074065, mailed Dec. 31, 2009.
Extended European Search Report issued in corresponding European Patent Application No. 09817235.6, mailed Mar. 16, 2012.
Office Action issued in corresponding Japanese Patent Application No. 2011-528168, mailed Sep. 11, 2012.

* cited by examiner

*Primary Examiner* — Erika A Washington
(74) *Attorney, Agent, or Firm* — Brinks Hofer Gilson & Lione (57) ABSTRACT

A mobility management method includes: receiving a first location update request sent by a Mobile Agent (MA); and determining, according to the first location update request and a binding relation between an MA context and a UE context, that a User Equipment (UE) moves together with the MA. A mobility management apparatus includes: a location update request receiving unit, configured to receive a first location update request sent by the MA; and a location moving determining unit, configured to determine, according to the first location update request and a binding relation between the MA context and the UE context, that the UE moves together with the MA.

22 Claims, 6 Drawing Sheets

MOBILITY MANAGEMENT METHOD, RELEVANT DEVICES, AND COMMUNICATION SYSTEM

CROSS-REFERENCE TO RELATED APPLICATIONS

This application is a continuation of International Application No. PCT/CN2009/074065, filed on Sep. 21, 2009, which claims priority to Chinese Patent Application No. 200810161460.7, filed on Sep. 27, 2008, both of which are hereby incorporated by reference in their entireties.

FIELD OF THE INVENTION

The present invention relates to communication technologies, and in particular, to a mobility management method, relevant devices, and a communication system.

BACKGROUND OF THE INVENTION

In a mobile communication system, after a User Equipment (UE) gets attached to a network, the network side allocates a wireless coverage called "paging area" to the UE. When the UE releases the connection with the network, if the network needs to send signaling or user-plane data to the UE, the network sends a paging message to the UE within the paging area; when the UE moves out from the current paging area, the UE needs to send a location update request to the network, and the network side allocates a new paging area to the UE.

Obviously, the UE sends the location update request more frequently if the UE moves faster. The speed and the scope of moving of a person are limited. In order to move quickly in a wide scope, people uses means of transport, for example, bus, metro, train, and ship. On a means of transport, all UEs move at the same speed in the same direction.

On some occasions such as parade and demonstration, masses of walkers may move together.

In the process of implementing the present invention, the inventor finds that: If a large number of UEs in the same location move toward the same destination at the same speed, when the UEs send location update requests to the network separately in a short time, the network needs to determine the current location of the UEs according to the location update request. The network receives masses of location update requests in a very short time, which leads to sharp increase of the processing load of the network.

SUMMARY OF THE INVENTION

The embodiments of the present invention provide a mobility management method, relevant devices, and a communication system to reduce the number of location update requests of the system on the whole.

A mobility management method includes:

receiving a first location update request sent by a Mobile Agent (MA); and determining, according to the first location update request and a binding relation between an MA context and a UE context, that a UE moves together with the MA.

A mobility management apparatus includes:

a location update request receiving unit, configured to receive a first location update request sent by an MA; and a location moving determining unit, configured to determine, according to the first location update request and a binding relation between an MA context and a UE context, that a UE moves together with the MA.

A mobility management apparatus includes:

an auxiliary MA context creating unit, configured to create an auxiliary MA context, and correlate the auxiliary MA context with an MA context on a Mobility Management Entity (MME) that an MA registers with; and a binding unit, configured to bind a UE context with the auxiliary MA context.

A UE includes:

a binding indication obtaining unit, configured to obtain a binding indication which indicates success of binding between a UE and an MA; and a controlling unit, configured to, after obtaining the binding indication which indicates success of binding between the UE and the MA, exercise control to refrain from sending a location update request when the UE is moving.

An MA includes:

an authentication request sending unit, configured to send an authentication request to the network side to request authorization of mobility agent capabilities;

an authentication result receiving unit, configured to receive an authentication result fed back by the network side; and an announcement sending unit, configured to send an announcement message that carries the authentication result to a UE so that the UE confirms the mobility agent capabilities of the MA.

A communication system includes:

an MME that a UE registers with, configured to create an auxiliary MA context, correlate the auxiliary MA context with an MA context on an MME that an MA registers with, and bind a UE context with the auxiliary MA context; and the MME that the MA registers with, configured to create an MA context, correlate the MA context with the auxiliary MA context on the MME that the UE registers with, and receive a location update request sent by the MA; and determine, according to the location update request, that the UE corresponding to the UE context bound with the auxiliary MA context moves together with the MA.

According to the embodiments of the present invention, the network side binds the MA context with the UE context; after receiving a location update request sent by the MA, the network determines that the UE bound with the MA has moved to the corresponding location. Therefore, the location of a moving UE can still be determined, without requiring each UE bound with the MA to send a location update request respectively, which relieves the processing load of the network.

According to the embodiments of present invention, while the UE is moving, the UE does not send a location update request after obtaining an indication of success of binding between the UE and the MA. Therefore, the network side does not need to receive or process masses of location update requests in a very short time, and the processing load of the network is relieved.

DETAILED DESCRIPTION OF THE EMBODIMENTS

Embodiment 1

Figure 1:
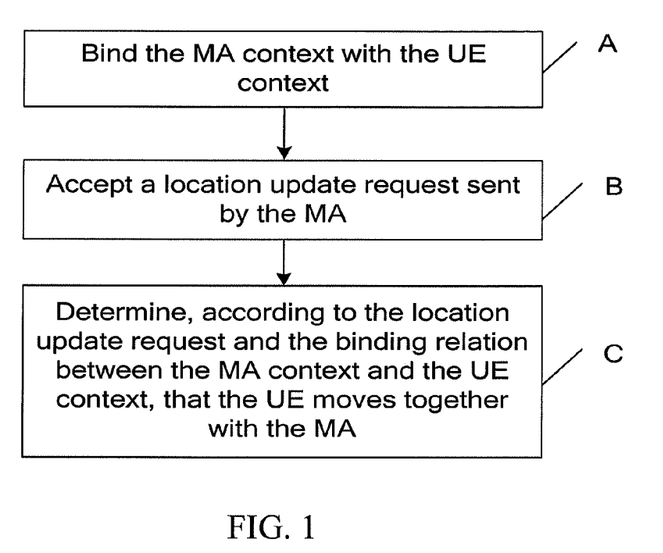
FIG. 1 is a flowchart of a mobility management method according to a first embodiment of the present invention.

As shown in FIG. 1, a mobility management method according to the first embodiment of the present invention includes:

binding, by the network side, an MA context with a UE context;

receiving, a location update request sent by the MA; and determining, according to the location update request and the binding relation between the MA context and the UE context, that a UE moves together with the MA.

The network side may be an MME. In an Evolved Packet System (EPS), the network side may be an MME and the location update request may be a Tracking Area Update (TAU) request. In the embodiments described below, the EPS is taken as an example.

The network side binds the MA context with the UE context in two modes: a single-host mode and a multi-host mode. The single-host mode requires that the bound UE and the MA should register with the same MME. At the time of binding, if the UE and the MA register with different MMEs, the MME that the MA registers with obtains the UE context from the MME that the UE registers with for the purpose of binding the UE context with the MA context. The multi-host mode allows the bound UE and the MA to register with different MMEs, and the UE is bound with the MA indirectly through correlation between the MME that the MA registers with and the MME that the UE registers with. The two modes will be detailed in the embodiments below.

Before the network side binds the MA context with the UE context, the method further includes: The network side (may be an MME that the MA registers with) receives an authentication request sent by the MA for requesting the network side to authorize mobility agent capabilities, authenticates the MA, and returns an authentication result to the MA; the MA broadcasts an announcement message that carries the authentication result; and the UE confirms, according to the authentication result, that the MA is authorized by the network side for mobility agent capabilities. The detailed process may be implemented in two modes, and the first mode includes the following steps:

S1. The MA sends an Attach Request message. The Attach Request message serves as an authentication request and carries information indicative of requesting to be an MA.

S2. After receiving the Attach Request message, the MME obtains the subscription data from a Home Subscriber Server (HSS) or Authentication Authorization Accounting (AAA) server, and authenticate the MA.

S3. After authenticating the MA successfully, the MME returns an Attach Accept message to the MA. The Attach Accept message carries an authentication result that includes security parameters authorized by the network. The security parameters include: authentication parameters granted for the UE to authenticate the MA, time segment granted for the MA to provide the mobility agent service, area grant for the MA to provide the mobility agent service (for example, the Tracking Area (TA) served by the MA), and the number of UEs to which the MA is authorized to provide mobility agent services.

In this step, the security parameters are delivered along with the Attach Accept message because not only the network needs to authenticate the MA, but also subsequent UEs need to authenticate the MA. The authentication verifies that the MA is authorized to provide the mobility agent service for a specific number of UEs in a specific area for a specific time.

S4. After the MA completes registration, the MA sends an announcement message within a specific scope through radio signals in order to announce existence of the MA. The announcement message carries an identifier (ID) of the MA, a Globally Unique Temporary Identifier (GUTI) allocated by the network to the MA, a TA list allocated by the MME to the MA, a TA in which the MA is currently located, security parameters, and capacity of the MA (number of UEs already served by the MA, number of more UEs servable by the MA, or load percentage).

The MA sends the announcement message within a specific scope because the MA hopes that the UEs in the specific scope can receive the announcement message. That is, the specific scope is an area in which the UE can move when being bound with the MA.

In this step, the MA may send the announcement message through a specially planned band and in a specially planned format, or through a band of broadcast messages in the existing mobile communication system. The format of the announcement message may be the format of the existing broadcast message, with specific parameters (such as MA ID) being carried in the message.

In the foregoing step, the MA authentication is implemented through an attaching procedure, or through other procedures such as Tracking Area Update (TAU) procedure, or through a new procedure. Regardless of the specific implementation procedures, the implementing of the present invention is not affected.

S5. After the UE enters the area covered by the signals of the MA, the UE receives the announcement message and confirms itself as staying in the coverage area of the MA signals for a specific time, namely, confirms itself as being bound with the MA. The UE authenticates the MA according to the security parameters in the announcement message, and confirms that the current MA is authorized by the network to provide mobility agent services.

It is probable that both the UE and the MA are moving. Sometimes the UE is in the coverage area of signals of an MA in a short time, and then leaves this coverage area. For example, a bus equipped with an MA runs around a UE, and this UE outside the bus receives the announcement message of the MA. In this case, the UE does not need to be bound with the MA, and the UE determines that the UE moves along with an MA only if the UE confirms itself as staying in the coverage area of the signals of this MA for a specific time In a large means of transport, many MAs may be installed in order to serve plenty of UEs. If, in this step, the UE receives announcement messages from more than one MA simultaneously for a specific time, the UE needs to select an MA for subsequent binding according to a preset policy. The preset policy may be: selecting the MA according to the signal strength of the MA in order to balance the load between MAs; or, selecting a light-loaded MA according to the load percentage in the announcement message broadcast by the MA; or, selecting the MA of the greatest weight (the weight of the MA is in proportion to the number of UEs granted for receiving the service of the MA: the larger the number of UEs granted for receiving the service of the MA is, the greater the weight of the MA is; the smaller the number of UEs granted for receiving the service of the MA is, the lighter the weight of the MA is); or, selecting an MA randomly; or, selecting the MA according to the binding time length. For example, if a UE stays in the coverage area of signals of MA1 for 2 minutes and stays in the coverage area of signals of MA2 for 4 minutes, the UE selects MA2 for subsequent binding.

The second mode includes the following steps:

T1. The network side pre-configures asymmetric keys including a public key and a private key. The asymmetric keys are characterized by: information encrypted with the private key can be decrypted only by the corresponding public key, and information encrypted with the public key can be decrypted only by the corresponding private key. The private key held by the network side is not open, and the network side sends the public key to all UEs. The public key of the network side may be programmed in a smart card of the UE, or the network side distributes the public key to the UEs in the process of attaching the UE or in the TAU process, or the public key is carried in a broadcast message sent by the eNodeB to the UEs.

T2. The MA pre-configures the asymmetric key including a public key and a private key. When the MA registers with the network side, the MA provides the configured public key for the MME that the MA registers with. For example, the MA sends an authentication request to the MME that the MA registers with, and the authentication request carries the public key configured by the MA. The MME confirms that the MA is authorized to provide the mobility agent service, and uses the private key configured by the MME to encrypt the public key configured by the MA and the MA ID. As a result, a first encrypted field is obtained, and is sent as an authentication result to the MA.

T3. The MA uses the configured private key to encrypt the MA ID, current timestamp, and authorization information granted by the network to the MA to obtain a second encrypted field, and sends an announcement message which carries the first encrypted field and the second encrypted field.

T4. The UE uses the public key configured by the network side to decrypt the first encrypted field and obtain the MA ID and the public key configured by the MA, and uses the public key configured by the MA to decrypt the second encrypted field and obtain the MA ID and the current timestamp. The UE judges whether the MA ID in the first encrypted field is the same as the MA ID in the second encrypted field. If the MA ID in the first encrypted field is the same as the MA ID in the second encrypted field, the UE judges whether the difference between the current timestamp and the timestamp in the announcement message is greater than a threshold. If the difference is not greater than the threshold, the UE confirms the MA as being authorized by the network to provide mobility agent services.

Through the foregoing authentication, the fake MA is never authorized by the network, and only the MA that passes the authentication can be authorized by the network to provide services for the UE.

In the first embodiment, the network side binds the MA context with the UE context; after receiving a location update request sent by the MA, the network side determines that the UE bound with the MA has moved to the corresponding location. Therefore, the location of a moving UE can be determined, without requiring each UE bound with the MA to send a location update request respectively, which relieves the processing load of the network.

Embodiment 2

Figure 2:
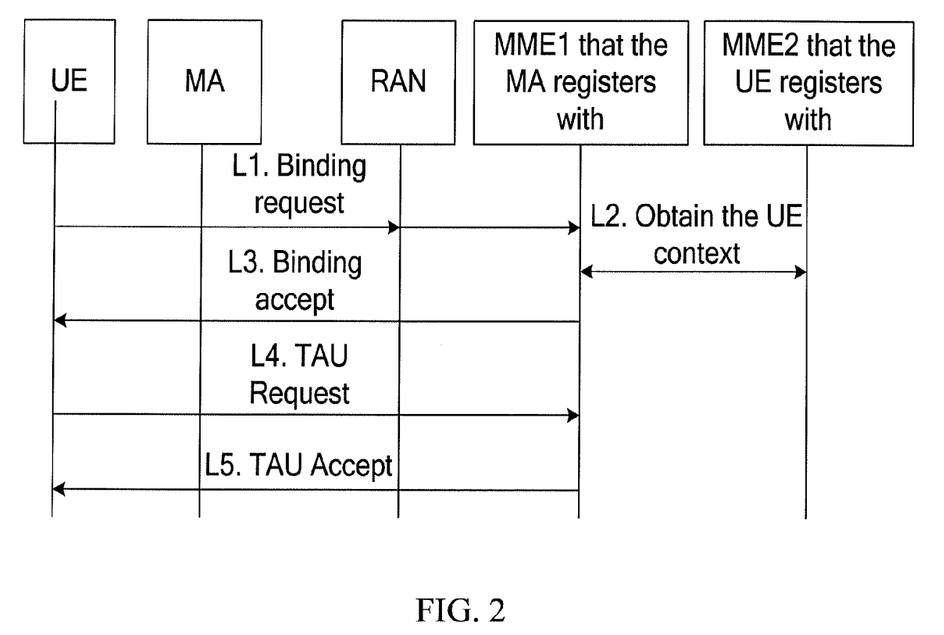
FIG. 2 is a signaling chart of a mobility management method according to a second embodiment of the present invention.

As shown in FIG. 2, a mobility management method according to the second embodiment of the present invention uses a single-host mode to bind a UE with an MA. The method includes the following steps:

L1. The UE sends a TAU Request message, where the TAU Request message is a binding request. The UE may initiate binding anytime after confirming that the UE itself is bound with the MA. Preferably, the UE initiate binding in the next TAU procedure after confirming that the UE itself is bound with the MA (the next TAU procedure may be triggered when the UE moves out from the current TA list, or triggered by timeout from a timer on the UE, where the timer controls periodical triggering of the TAU Request). The TAU Request message carries the GUTI of the UE, ID of the MA selected by the UE, addressing information of the MME that the MA registers with, and a binding indication. The addressing information of the MME that the MA registers with may be the GUTI of the MA, and is written in a field in the TAU Request message, where the field is intended for routing the binding request message by a Radio Access Network (RAN). The field intended for routing the binding request message by the RAN is originally designed for carrying the addressing information of the MME that the UE registers with, and the addressing information of the MME that the UE registers with may be the GUTI of the UE. Therefore, the GUTI of the UE needs to be placed in a newly added information element in the message. In this way, The RAN can route, according to the MME code in the GUTI of the MA in the TAU Request message, the message to MME 1 that the MA registers with.

L2. MME1 locates the MA context according to the GUTI of the MA, and checks whether the MA is authorized by the network to provide mobility agent services. According to the MME code in the GUTI of the UE, MME1 checks whether the UE is currently registered with MME1 itself or with another MME. If the UE is currently registered with another MME such as MME2, MME1 obtains the UE context from MME2; if the UE is currently registered with MME1 itself, MME1 locates the pre-stored UE context according to the GUTI of the UE. (What is shown in the figure is how MME1 obtains the UE context from MME2.)

L3. MME1 correlates the UE context with the MA context, and then MME1 knows the bound UE will move along with the MA subsequently. MME1 returns a binding success indication to the UE. The binding success indication may be a TAU Accept message indicating success of binding.

Alternatively, MME1 may not return a binding success indication to the UE. Instead, after sending the binding request, the UE judges whether a response message is received from MME1 for a specific time, and regards the binding as successful if no response message is received from MME1 for a specific time.

After the UE is bound with the MA successfully, the UE sends no more TAU Request while moving across the TAs. The TAU Request is a location update request. However, the UE at this time can still initiate a periodical TAU procedure to maintain the binding relation with the MA on the network side. Moreover, the UE may continue receiving the announcement message from the MA in the binding period, and obtains a new TA list from the announcement message and uses the new TA list as its own current TA list, where the new TA list is allocated by the MME to the MA. Nevertheless, the UE may request the MME to allocate a TA list to the UE at the time of unbinding.

The foregoing step implements binding between the UE and the MA. The following describes how the MA performs location update on behalf of the bound UE.

L4. The MA detects a broadcast signal sent by an eNodeB, and finds that the MA has moved out from the TA list scope allocated by the MME to the MA and has entered a target TA (TA2), and the MA sends a TAU Request message (the first location update request); the eNodeB receives the TAU Request message, adds the target TA identifier (TAI2) into the TAU Request message, and sends the message. Supposing that the original ME1 that the MA registers with can still serve TA2, the eNodeB routes the TAU Request message to MME1.

L5. After receiving the TAU Request, MME1 locates the MA context, allocates a new TA list to the MA, and stores the new TA list in the MA context. The new TA list includes but is not limited to TAI2. TAU Accept message is returned by MME1 to the MA, and carries the new GUTI, TA list allocated to the MA. The TAU Accept message could further include the number of UEs bound with the MA, or load percentage.

When allocating the TA list to the MA, MME1 may decrease the number of TAs included in the TA List, in order to reduce the area of the paging area.

Because the MA is bound with multiple UEs and performs location update on behalf of the UEs, the location update messages of the UEs are decreased massively. If the number of TAs included in the TA list allocated by MME1 to the MA decreases, the broadcast messages of the eNodeB are sent to the UEs in a smaller area when the eNodeB pages the UEs, which saves radio resources.

According to the second embodiment, MME1 correlates the UE context with the MA context, binds the UE with the MA, and sends a binding success indication to the UE. The binding success indication instructs the UE not to send a TAU Request while the UE moves across the TAs. After receiving a location update request sent by the MA bound with multiple UEs, the network side determines that the UE bound with the MA has moved to the corresponding location. Therefore, the location of a moving UE can be determined without requiring each UE bound with the MA to send a location update request respectively, which relieves the processing load of the network.

Embodiment 3

Figure 3:
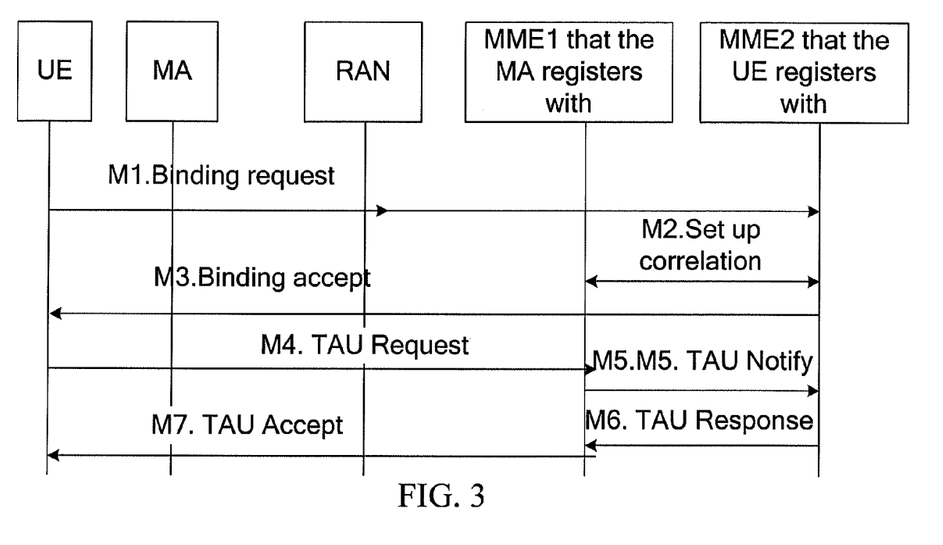
FIG. 3 is a signaling chart of a mobility management method according to a third embodiment of the present invention.

As shown in FIG. 3, a mobility management method according to the third embodiment of the present invention uses a multi-host mode to bind a UE with an MA. The method includes the following steps:

M1. The UE sends a TAU Request, where the TAU Request is a binding request. The UE may initiate binding anytime after confirming that the UE itself is bound with the MA. The request carries a GUTI allocated by the network to the UE, ID of the MA selected by the UE, GUTI of the MA, and a binding indication.

In the multi-host solution, the RAN does not need to route the TAU Request to the MME1 that the MA registers with. Therefore, the UE writes its GUTI in the "UE GUTI" field in the TAU Request, and writes the GUTI of the MA into another field of the request.

According to the MME code included in the GUTI in the "UE GUTI" field of the TAU Request, the RAN determines that the UE is currently registered with MME2, and routes the TAU Request to MME2.

M2. MME2 locates the UE context according to the UE GUTI in the TAU Request, and judges, according to the ID or GUTI of the MA, whether the MA is currently registered with MME2. If the MA is not currently registered with MME2, MM2 judges whether an auxiliary MA context exists on MME2. If an auxiliary MA context exists on MME2, MME2 correlates the auxiliary MA context with the UE context directly, and increases the counter of the number of bound UEs in the auxiliary MA context by 1; if no auxiliary MA context exists on MME2, MME2 creates an auxiliary MA context, correlates the auxiliary MA context with the UE context, and sets the counter of the number of bound UEs in the auxiliary MA context to 1. Afterward, according to the GUTI of the MA, MME2 determines that the MA context exists on MME1, and creates a context correlation with MME1. If determining that the MA is currently registered with MME2, MME2 binds the MA context with the UE context directly.

Specifically, MME2 creates a context correlation with MME1 in this way: MME2 sends a context correlation request to MME1, and the request indicates that an auxiliary MA context is already created on MME2. The auxiliary MA context includes an address of the MME1 that the MA registers with and an ID of the corresponding MA context. The address of the MME1 that the MA registers with may be retrieved from a Domain Name System (DNS) server according to the MME code included in the GUTI of the MA. The context correlation request includes an ID of the corresponding MA context and an ID of the corresponding auxiliary MA context. The ID of the corresponding MA context is used for MME1 to locate the MA context, and may be the GUTI of the MA. According to the identifier of the corresponding MA context, MME1 locates the corresponding MA context, stores the information about the auxiliary MA context (including the address of MME2 and the ID of the auxiliary MA context) on MME2 into the MA context, and sends a context correlation response to MME2. If the auxiliary MA context exists on MME2, it indicates that a context correlation is already created between MME2 and MME1, and it is not necessary for MME2 to send a context correlation update request to MME1 each time when a UE gets bound towards MME2. Instead, after the correlation is created, MME2 may send a context correlation update message to MME1 periodically. This message carries state of the MA context (indicating whether an auxiliary MA context exists on MME2) and/or the number of UEs bound with the auxiliary MA context. The number of UEs bound with the auxiliary MA context is used for MME1 to check whether the auxiliary MA context exists on MME2 and/or for MME1 to obtain the number of UEs bound with the auxiliary MA context on MME2 and count the number of UEs bound with all auxiliary MA contexts correlated with the MA context.

M3. MME2 returns a binding success indication to the UE. The binding success indication may be a TAU Accept message indicating success of binding.

Alternatively, MME2 may not return a binding success indication to the UE. Instead, the UE regards the binding as successful if no response message is received from MME1, after sending the binding request.

After the binding succeeds, the UE sends no more TAU Request while moving across the TAs. The TAU Request is a location update request. However, the UE at this time can still initiate a periodical TAU procedure to maintain the binding relation with the MA on the network side. Moreover, the UE may continue receiving the announcement message from the MA in the binding period, and obtains a new TA list from the announcement message and uses the new TA list as its own current TA list, where the new TA list is allocated by the MME to the MA. Nevertheless, the UE may request the MME to allocate a TA list to the UE at the time of unbinding.

The foregoing step implements binding between the UE and the MA. The following describes how the MA performs location update on behalf of the bound UE.

M4. The MA detects a broadcast signal sent by an eNodeB, and finds that the MA has moved out from the TA list scope allocated by MME1 to the MA and has entered a target TA (TA2), and the MA sends a TAU Request message; the eNodeB receives the TAU Request message, adds the target TA identifier (TAI2) into the TAU Request message, and sends the message. Supposing that the original MME1 that the MA registers with can still serve TA2, the eNodeB routes the TAU Request message to MME1.

M5. After receiving the TAU Request message, MME1 locates the MA context, allocates a new TA list to the MA, and stores the new TA list in the MA context. The new TA list includes but is not limited to TAI2. According to the MA context, MME1 confirms that a context correlation is created with other MMEs. If the network configuration determines the network to initiate paging to the UE in the TA list directly, MME1 obtains the address of the correlated MME and the ID of the corresponding auxiliary MA context from the MA context, and sends a TAU Notify message to the correlated MME (such as MME2). The message carries a new TA list allocated by MME1 to the MA and the ID of the corresponding auxiliary MA context. After receiving the message, MME2 locates the auxiliary MA context according to the ID of the corresponding auxiliary MA context, and stores the new TA list in the auxiliary MA context. If the network does not page the UE in the TA list directly, but the MA forwards the paging, MME2 is not necessary to update the TA list in the auxiliary context in this step.

M6. MME2 returns a TAU Response message to MME1.

M7. MME1 returns a TAU Accept message to the MA. The TAU Accept message carries the new GUTI and TA list allocated to the MA, and the number of UEs already bound with the MA.

In the third embodiment, to bind the UE with the MA, MME2 that the UE registers with, correlates the UE context with the auxiliary MA context, and establish MA context correlation between MME2 and MME1 that the MA registers with. The MME2 sends a binding success indication to the UE. The binding success indication instructs the UE not to send a TAU Request while the UE moves across the TAs. After receiving a location update request sent by the MA bound with multiple UEs, the network side determines that the UE bound with the MA has moved to the corresponding location. Therefore, the location of a moving UE can be determined without requiring each UE bound with the MA to send a location update request respectively, which relieves the processing load of the network. In this embodiment, the MA context correlation is created through direct message exchange between the two MMEs. In practical applications, for example, when the MME that the MA registers with is in a loose coupling relation to the MME that the UE registers with, the correlation may be created in the way that an intermediate network element performs message forwarding.

Embodiment 4

Figure 4:
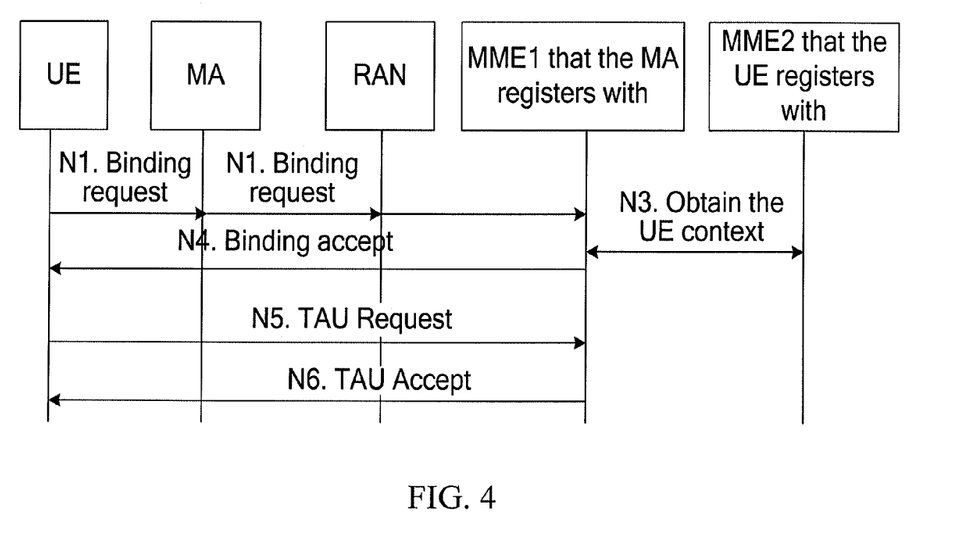
FIG. 4 is a signaling chart of a mobility management method according to a fourth embodiment of the present invention.

As shown in FIG. 4, the fourth embodiment of the present invention enhances the functions of the MA so that the MA provides the functions of a Mobile Base Station (MBS). The UE performs binding through the MA, and binds the UE with the MA in a single-host mode. The method includes the following steps:

N1. The UE sends a TAU Request to the MA. The TAU Request is a binding request and carries the GUTI of the UE, and may further carry information related to the MA. The information related to the MA includes MA ID, the TA in which the MA is currently located, and the GUTI of the MA. If the TAU Request carries no information related to the MA, the MA adds the information related to the MA into the TAU Request.

N2. The MA sends a TAU Request message to the MME1 that the MA registers with.

As regards whether the TAU Request still passes through the RAN, it depends on the backhaul scheme selected by the MA. If the MA selects the radio link of the current mobile communication network as a backhaul, the message needs to pass through the RAN; if the MA selects other backhaul schemes such as satellite, Wireless Local Area Network (WLAN), or Worldwide Interoperability for Microwave Access (WiMax), the message does not need to pass through the RAN.

N3-N6 are the same as L2-L5.

In the fourth embodiment, the UE sends a TAU Request to MME1 through the MA. MM1 correlates the UE context with the MA context, binds the UE with the MA, and sends a binding success indication to the UE. The binding success indication instructs the UE not to send a TAU Request while the UE moves across the TAs. After the network side receives a location update request sent by the MA bound with multiple UEs, the network side determines that the UE bound with the MA has moved to the corresponding location. Therefore, the location of a moving UE can be determined without requiring each UE bound with the MA to send a location update request respectively, which relieves the processing load of the network.

The fourth embodiment describes the mode of binding performed by the UE through the MA, supposing that the single-host mode is applied. In the case that the multi-host mode is applied, the implementation method includes: The UE sends a binding request, the MA or access convergence gateway routes the binding request of the UE to the MME that the UE registers with. The subsequent steps are the same as M3 and M7.

After the MA is bound with the UE, the scenario comes in several types: The network side pages the bound UE; the binding relation exists after the signaling connection is created between the network side and the UE; and the MA notifies the bound UE to get bound again or unbound.

I. The network side pages the bound UE.

After the UE is bound with the MA, the network side regards the current location of the MA as the current location of the UE. Therefore, the network side may page the UE in the current TA list of the MA (namely, TA list allocated to the MA).

Three paging modes are applicable:

1. The MA context in the MME or the auxiliary MA context always stores the TA list allocated to the MA. Therefore, the MME that the UE is currently registered with may instruct the RAN to page the UE in the TA list of the MA directly.

In order to improve the success ratio of paging, the MME may instruct the RAN to not only send paging messages in the paging area in the TA list of the MA (namely, the current paging area of the MA), but also send paging messages in the cell around the TA list of the MA. This avoids paging failure that occurs when the bound UE is in a nearby cell outside the paging area and unable to receive the paging message in the case that the MA is located at the edge of the paging area.

2. The UE is paged through the MA when the UE is bound with the MA in a single-host mode in the network The MME1 that the MA registers with decides to initiate paging to the UE; MME1 sends the paging message to the MA first, and the MA broadcasts the paging message within its own coverage; after receiving the paging message, the UE notifies the MA to stop broadcasting the paging message, and responds to the paging by sending a service request message to MME1.

3. The UE is paged through the MA when the UE is bound with the MA in a multi-host mode in the network P1. MME2 decides to page the UE, and finds that the UE context is correlated with an auxiliary MA context. MME2 obtains the address of the MME1 that the MA registers with from the auxiliary MA context, and sends a paging message to MME1. The paging message carries the ID of the destination UE.

P2. After receiving the paging message, MME1 sends the paging message to the MA.

P3. The MA broadcasts the paging message within its coverage area in order to page the UEs.

P4. After receiving the paging message, the UE may notify the MA to stop broadcasting the paging message, and send a service request message to MME2 in response to the paging message.

In the case that the UE is paged through the MA, if the MA is connected to the network side through radio access and the wireless connection to the network side is released, it may be necessary to page the MA first to create the wireless connection again before sending the paging message destined for the UE to the MA. If the MA is connected to the network side through fixed access, for example, when the MA is placed in a cinema or stadium, the paging message destined for the UE may be sent to the MA directly.

II. Binding relation after the signaling connection is set up between the network side and the UE.

If the MA is not capable of forwarding signaling between the UE and the network or the user-plane data, but the UE needs to carry out a service, or, if the UE, after receiving a paging message, needs to send a service request message to the current MME (such as MME2) that the UE registers with, MME2 receives the service request message and sets up a signaling connection to the UE through the RAN in order to response the service request message of the UE. Moreover, MME2 recovers the bearer between the UE and the RAN according to the request of the UE. If the signaling connection is set up between the UE and the network, the UE triggers the handover procedure and the TAU procedure as if the UE is not bound with the MA.

If the signaling connection is set up between the UE and the network side, the following two processing schemes are applicable to the binding relation between the UE and the MA:

1. The binding relation between the UE and the MA is cleared on both the UE and the MME. After the signaling connection is released, the UE becomes idle and gets bound with the original MA again, or selects a new MA for binding.

Specifically, for the single-host mode, the MME1 that the MA registers with (because MME1 has obtained the UE context, MME1 is also the current MME that the UE registers with) deletes the binding relation between the MA context and the UE context. For the multi-host mode, the MME2 that the UE registers with deletes the binding relation between the auxiliary MA context and the UE context, and decreases the counter of the number of bound UEs by 1. When the counter reads 0, MME2 obtains, from the auxiliary MA context, the information about the MME1 that the MA registers with, and sends a notification message to MME1 as an instruction of deleting the context correlation. The notification message carries an ID of the corresponding MA context (such as the GUTI of the MA). MME1 deletes the address of MME2 and the ID of the corresponding auxiliary MA context from the MA context in order to delete the context correlation with MME2.

As described above, the binding relation is cleared between the UE and the MA when the signaling connection is set up between the UE and the network side, thus avoiding the unbinding procedure triggered after the UE detects itself as having moved out from the coverage area of the MA, and simplifying the network processing.

2. The UE keeps the binding relation with the MME even if the signaling connection is set up between the UE and the network side. In this case, after the UE detects itself as having moved out from the coverage area of the bound MA, the UE needs to initiate an unbinding procedure to notify the network side that the UE has left the coverage area of the MA.

III. The MA notifies the bound UE to get bound again.

Figure 5:
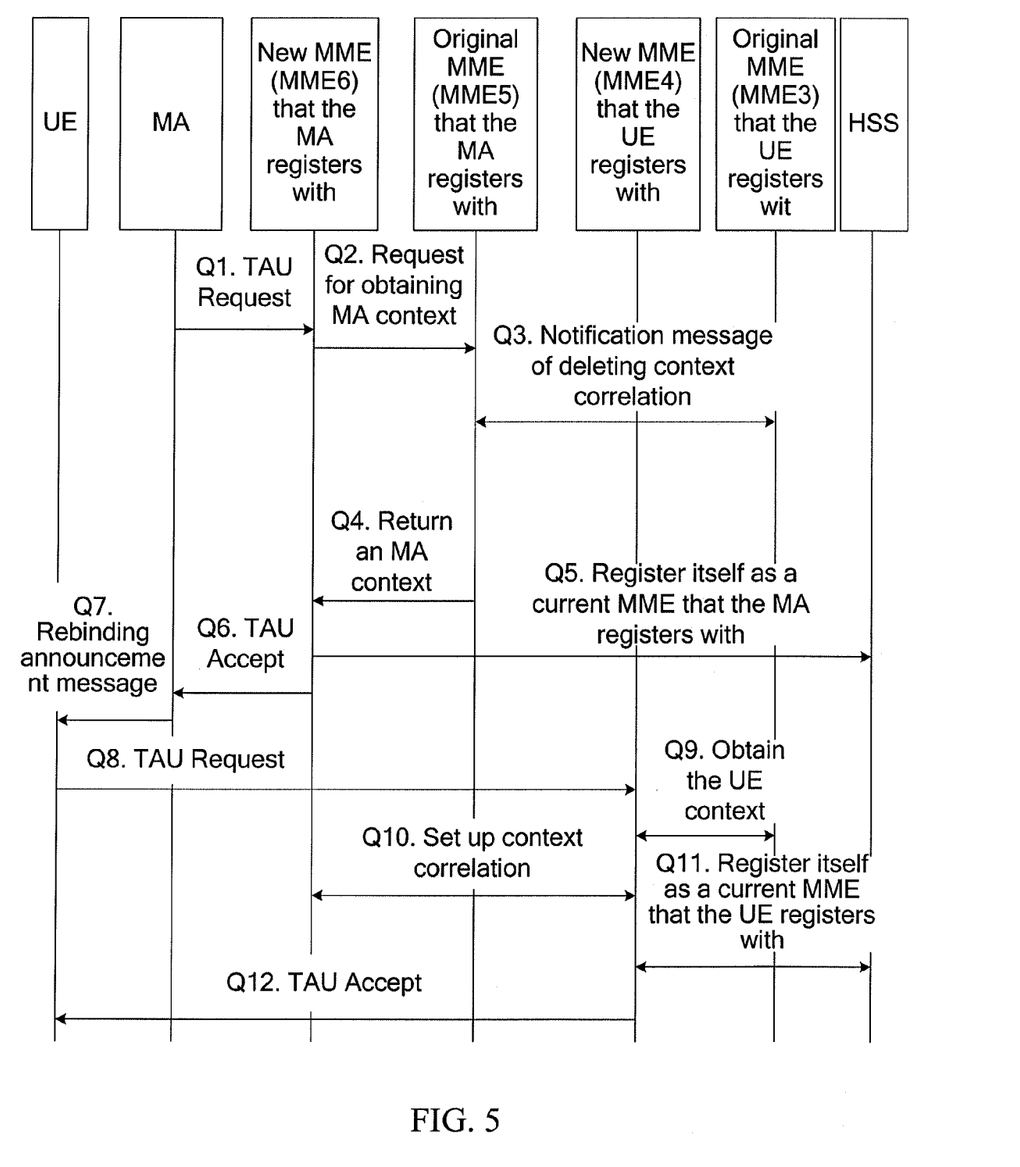
FIG. 5 is a signaling chart about how an MA notifies a bound UE to get bound again according to an embodiment of the present invention.

After the UE is bound with the MA, the UE initiates no more TAU procedure while moving across the TAs, thus reducing the TAU Request messages. However, when the MA moves in a wide scope and the MME has to hand over, the MME that the MA registers with has changed, and, in the single-host scheme, the contexts of all UEs bound with the MA need to be migrated to a new MME; in a multi-host scheme, all or part of the bound UEs may need to be migrated to a new MME (which is not necessarily the same as the new MME to which the MA is migrated), and the MA context correlation between the new MME that the MA registers with and the MME that the UE registers with needs to be set up again because the MME that the MA registers with has changed. In this embodiment, the network side releases all binding relations between the UEs and the MA first, and then notifies the MA. The MA notifies the bound UE to initiate a TAU procedure to perform binding again. As shown in FIG. 5, the detailed process includes the following steps:

Q1. The MA moves out from the TA in the TA list, and enters another TA to send a TAU Request message. This message is a second location update request. Because the original MME that the MA registers with cannot serve the new TA, the RAN selects a new MME (the new MME with which the MA registers, namely, MME6), and routes the TAU Request message to MME6.

Q2. MME6 sends a request to the original MME that the MA registers with (original MME with which the MA registers, namely, MME5) to obtain the MA context.

Q3. After MME5 receives the request for obtaining the context, if the MA is bound with the UE in a multi-host mode, MME5 obtains the address of the correlated MME and the ID of the corresponding auxiliary MA context from the MA context, and sends a notification message to all correlated MMEs as an instruction of deleting the context correlation. The notification message carries the ID of the corresponding auxiliary MA context. After receiving the notification message of deleting the MA context correlation, the correlated MME (such as the original MME that the UE registers with, namely, MME3) locates the corresponding auxiliary MA context, clears the binding relation between the MA context and the UE, deletes the auxiliary MA context, and sends a response to MME5.

Q4. MME5 sends the MA context to MME6 after the binding relation between the MA context and the UE context is cleared on MME5 and all correlated MMEs (namely, after the binding relation between the auxiliary MA context and the UE context on the correlated MMEs is cleared; and the address of the correlated MME and the ID of the corresponding auxiliary MA context, which are stored in the MA context on MMES, are cleared).

Q5. On the HSS, MME6 registers itself as the current MME that the MA registers with.

Q6. MME6 allocates a new GUTI and TA list to the MA, and returns a TAU Accept message to the MA. The message carries the new GUTI and TA list allocated to the MA, and a rebinding indication.

Q7. After receiving the TAU Accept message, the MA confirms, according to the rebinding indication, the need of rebinding the UE, and sends a rebinding announcement message to all UEs bound with the MA. The rebinding announcement message instructs such UEs to perform a rebinding procedure.

Q8. After receiving the rebinding announcement message, the UE initiates a TAU Request message. The message carries GUTI of the UE, the ID of the MA, the GUTI of the MA (new GUTI allocated by MME6 to the MA), and a binding indication.

After receiving a rebinding announcement message, each UE may wait for a random period of time before sending the next TAU Request message in order to prevent many UEs from initiating TAU rebinding in a short time, and relieve impact on the network arising from that.

In the multi-host mode, the RAN routes, according to the UE GUTI carried in the message, the TAU Request message to the original MME (MME3) that the UE registers with. If MME3 is unable to serve the UE that enters a new TA, the RAN selects another MME capable of serving the TA (for example, selects MME4 as a new MME with which the UE registers), and routes the TAU Request message to MME4.

Q9. MME4 obtains the UE context from MME3.

Q10. According to the ID or GUTI of the MA, MME4 confirms that MME4 itself is not the current MME that the MA registers with, and judges whether an auxiliary MA context exists on MME4. If an auxiliary MA context exists, MME4 correlates the auxiliary MA context with the UE context directly; if no auxiliary MA context exists, MME4 creates an auxiliary MA context, and correlates the auxiliary MA context with the UE context. Afterward, according to the GUTI of the MA, MME4 determines that the MA context exists on MME6, and creates a context correlation with MME6. The principles of the rebinding procedure here are the same as those of the initial binding.

Q11. On the HSS, MME4 registers itself as the current MME that the UE registers with.

Q12. MME4 returns a TAU Accept message to the UE. The message carries a new GUTI allocated by MME4 to the UE.

The foregoing describes the procedure of rebinding the MA with the UE in the multi-host mode. If the MA is bound with the UE in the single-host mode, the original MME (MME5) that the MA registers with is the same as the original MME (MME3) that the UE registers with, and the new MME (MME6) that the MA registers with is the same as the new MME (MME4) that the UE registers with. In this case, unlike the description above, MME6 in Q2 sends a request for obtaining context and an indication of clearing the binding relation between the MA and the UE to MME5; and MME5 in Q3 clears the binding relation between the MA and the UE, namely, clears the correlation between the MA context and the UE context. MME4 in Q10 sets up a binding relation between the MA context and the UE context.

In conclusion, the MA instructs the UE to perform rebinding, and therefore, when the MA performs MME handover, the MA gets bound with the UE again to enable the network to determine that the bound UE is moving together with the moving of the MA after the MME handover.

IV. Unbinding procedure is initiated.

Figure 6:
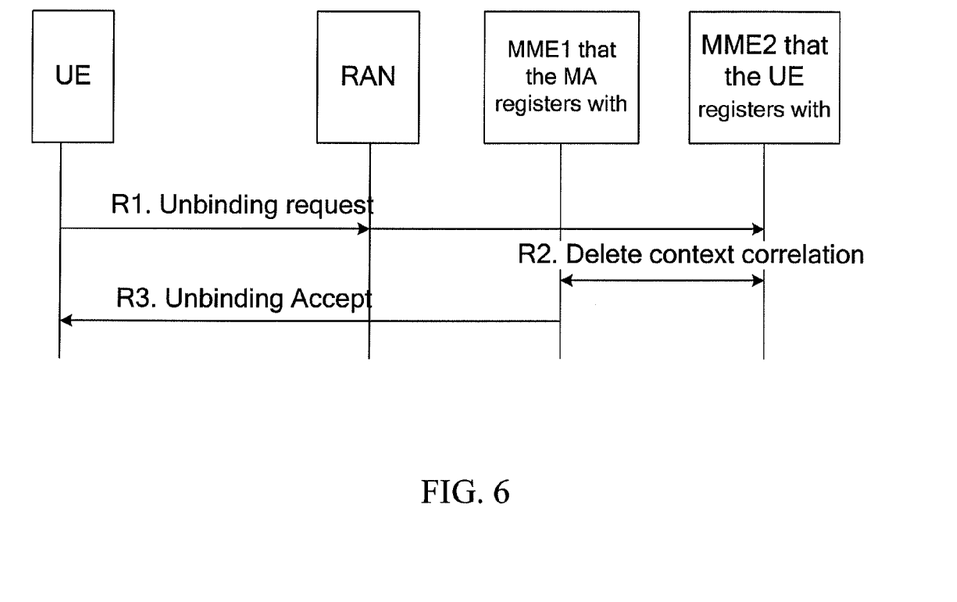
FIG. 6 is a signaling chart of unbinding according to an embodiment of the present invention.

1. The UE initiates a TAU unbinding procedure after detecting that the UE itself as having moved out from the coverage of the MA. FIG. 6 shows an unbinding procedure triggered by the UE. The procedure includes the following steps:

R1. The UE detects that the strength of the MA signals is lower than a preset threshold, or the MA broadcast message requires the UE to get unbound, and therefore, the UE initiates a TAU Request. The TAU Request is an unbinding request and carries the GUTI of the UE, the MA ID, and an unbinding indication. The TAU Request is routed to MME2 (current MME that the UE registers with).

R2. For the single-host mode, because the UE context is migrated to the current MME1 that the MA registers with at the time of binding, the current MME2 that the UE registers with is the same as the current MME1 that the MA registers with. Therefore, the MME1 deletes the binding relation between the MA context and the UE context. For the multi-host mode, the current MME2 that the UE registers with confirms that the UE context is correlated with the auxiliary MA context, and decreases the counter by 1. When the counter reads 0, MME2 obtains the information about the current MME1 that the MA registers with from the auxiliary MA context, and sends a notification message to MME1 as an instruction of deleting the context correlation. After receiving the notification message, MME1 deletes the information about MME2 and the ID of the corresponding auxiliary MA context from the MA context. (What is shown in the figure is the multi-host mode.)

Alternatively, when the counter reads 0, MME2 does not send a notification message to MME1 as an instruction of deleting the context correlation, but waits for a period such as 30 seconds in order to check whether a new UE wants to get bound with the MA in a short time. If a new UE wants to get bound with the MA in a short time, MME2 does not send the notification message as an instruction of deleting the context correlation; otherwise, MME2 sends the notification message.

R3. MME2 allocates a new GUTI and TA list to the UE, and sends a TAU Accept message to the UE. The message carries the new GUTI and TA list allocated to the UE.

After the unbinding procedure, when the UE moves out from the TA in the TA list and enters a new TA, the UE initiates a TAU procedure to notify the location change like in the prior art.

In conclusion, after the UE detects that the UE itself has moved out from the coverage of the MA, the UE initiates a TAU procedure initiatively for the purpose of unbinding. Therefore, it is ensured that the binding relation between the MA and the UE is released after the UE moves out from the coverage of the MA; when the UE moves subsequently, the UE can continue to trigger the TAU procedure like in the prior art rather than determine moving of the UE according to the moving of the MA; and it is ensured that the network side can obtain the correct location of the moving UE.

Figure 7:
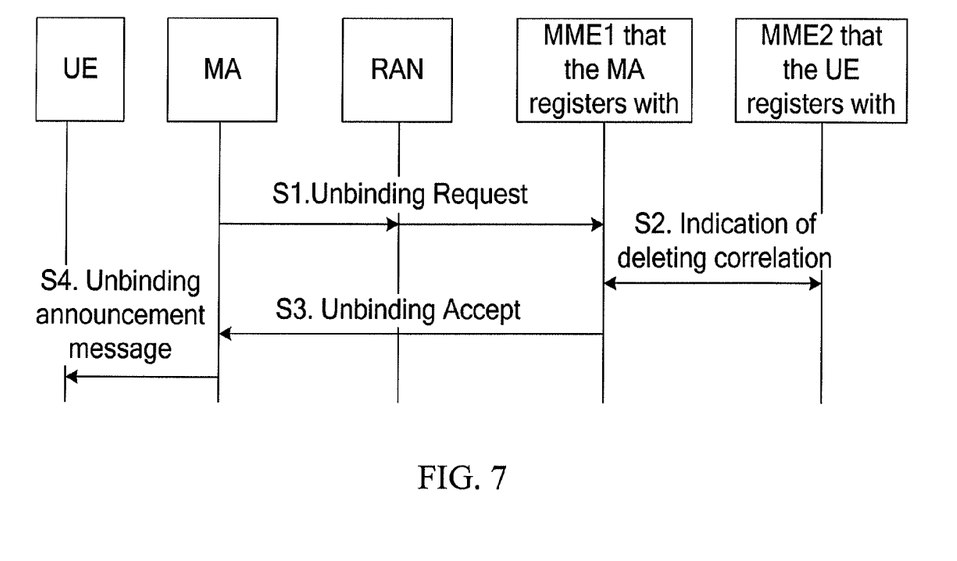
FIG. 7 is a signaling chart of unbinding according to an embodiment of the present invention.

2. In some circumstances (for example, when a bus equipped with an MA arrives at the terminus), the MA may decide to stop the mobility agent service; or, when the bearer capability of the MA deteriorates, the MA decides to unbind the bound UEs in batches. FIG. 7 shows the unbinding procedure triggered by the MA. The procedure includes the following steps:

S1. The MA sends a TAU Request that carries an instruction of unbinding all current UEs.

S2. The current MME1 that the MA registers with receives the TAU Request. If the single-host mode is applied, MME1 clears all binding relations between the UE contexts and the MA contexts. If MME1 has never refreshed the TA list in the UE context on any occasion of reallocating the TA list to the MA, the following step needs to be performed as a prerequisite: MME1 sets the TA list in all bound UE contexts to the current TA list of the MA. For the multi-host mode, MME1 obtains the information about the correlated MME (address of the correlated MME and the ID of the corresponding auxiliary MA context) from the MA context, and sends a notification message to the correlated MMEs (such as MME2) as an instruction of deleting the context correlation. The notification message carries the ID of the corresponding auxiliary MA context. If MME1 has never notified MME2 on any occasion of reallocating the TA list to the MA, the notification message of deleting the context correlation further carries the current TA list of the MA. MME2 locates the auxiliary MA context according to the ID of the auxiliary MA context, sets the TA list in the UE context correlated with the auxiliary MA context to the current TA list of the MA, clears the binding relation between the auxiliary MA context and the UE context, deletes the auxiliary MA context, and sends a response to MME1. (What is shown in the figure is the multi-host mode.)

S3. The current MME1 that the MA registers with returns a TAU Accept message to the MA, indicating success of unbinding. The message carries the current TA list of the MA.

S4. The MA sends an unbinding announcement message to the UE, indicating that the binding relation is released. The unbinding announcement message carries the current TA list of the MA.

After receiving the unbinding announcement message, the UE stores the current TA list of the MA in the announcement message as its own current TA list, and releases the binding with the MA. That is, when the UE moves out from the TA in the TA list and enters a new TA, the UE initiates a TAU procedure to notify the location change like in the prior art.

A certain distance may exist between the UE and the bound MA. In rare circumstances, the bound UE may find that the UE has moved out from the TA in the current TA list of the MA after receiving the unbinding announcement message from the MA. In this case, the TA list in the UE context, which is stored on MME2, is not accurate, and the UE needs to initiate a TAU procedure to report its accurate location to MME2, and request MME2 to reallocate a TA list to the UE.

In the foregoing example, the MA unbinds all UEs. In practice, the MA may unbind a part of the UEs, for example, unbind the UEs registered with a specific MME in the case of the multi-host mode. The implementation mode is similar, and is not repeatedly described here any further.

Through the unbinding triggered by the MA above, when the MA is unable to serve as an MA or stops serving as an MA, the binding relations between the MAs and the UEs can be cleared in batches, without requiring each bound UE to initiate an unbinding procedure respectively, which reduces the signaling load of unbinding.

In the embodiments above, the UE sends the binding request initiatively for the purpose of getting bound with the MA, which is only an exemplary implementation mode of the technical solution under the present invention and shall not be construed as limitation on the present invention. In practice, the network side may bind the MA with the UE initiatively. For example, after the network side authenticates the MA successfully (namely, authorizes mobility agent functions of the MA), the network side binds the MA with the UE around the MA, and sends a binding indication to the UE after the binding operation. The binding indication instructs the UE not to initiate a TAU procedure while the UE moves across the TAs.

Embodiment 5

Figure 8:
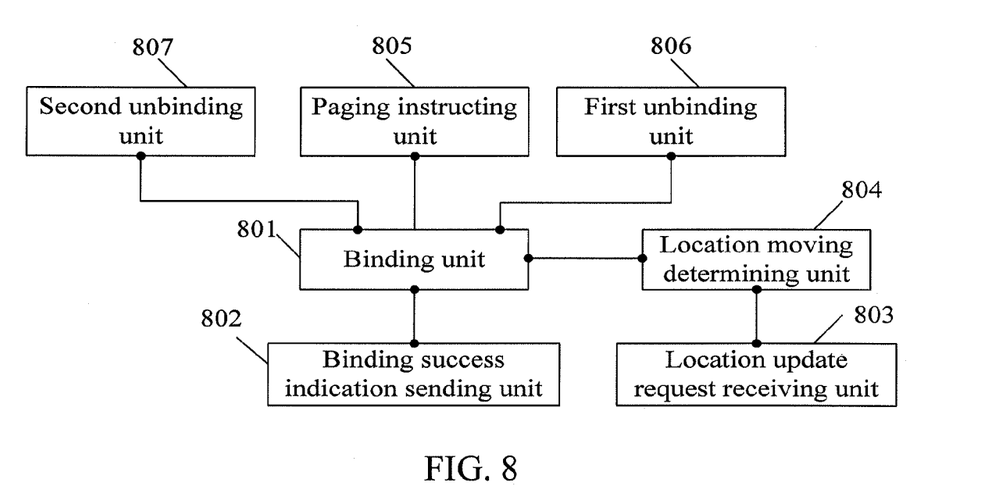
FIG. 8 shows a structure of a mobility management apparatus according to a fifth embodiment of the present invention.

As shown in FIG. 8, a mobility management apparatus according to the fifth embodiment of the present invention includes:

a binding unit 801, configured to bind an MA context with a UE context;

a binding success indication sending unit 802, configured to send a binding success indication to the UE after the binding unit 801 binds the MA context with the UE context in order to instruct the UE not to send a location update request at the time of location update;

a location update request receiving unit 803, configured to receive the location update request sent by the MA; and a location moving determining unit 804, configured to: according to the location update request, modify the MA context and determine that the UE moves together with the MA, after the binding unit binds the MA context with the UE context.

Alternatively, the mobility management apparatus may include no binding success indication sending unit 802. Instead, the UE regards the binding as successful if the UE receives no response message within a specific period after sending a binding request, without requiring the mobility management apparatus to send a binding indication indicative success of binding between the MA and the UE to the UE.

The binding unit 801 includes:

a judging unit, configured to judge, after receiving the binding request for binding the UE with the MA, whether the UE is registered with the mobility management apparatus;

a UE context obtaining unit, configured to obtain a UE context from the mobility management apparatus if the judging unit determines that the UE is registered with the mobility management apparatus, and obtain the UE context from the current MME that the UE registers with if the judging unit determines that the UE is not registered with the mobility management apparatus; and a correlations setup unit, configured to correlate the UE context obtained by the UE context obtaining unit to the MA context.

If the MA has been registered with an MME before, once the MA hands over between the MMEs and the mobility management apparatus becomes a new MME with which the MA registers, the apparatus further includes a rebinding notifying unit, which is configured to: obtain the MA context and UE context from the original MME that the MA registers with after receiving a second location update request from the MA, instruct the original MME that the MA registers with to clear the binding relation between the MA context and the UE context, and send a location update accept message that carries a rebinding indication to the MA. The binding unit 801 is configured to bind the UE context with the MA context obtained from the original MME that the MA registers with after receiving the binding request for binding the UE with the MA.

The apparatus further includes:

a paging instructing unit 805, configured to: after the binding unit binds the MA context with the UE context, instruct the RAN to page the UE in the current paging area of the MA when necessary; or, instruct the RAN to page the UE in the current paging area of the MA and the cells around the current paging area; or, send a paging message that carries the UE ID to the MA in order to instruct the MA to page the UE.

a first unbinding unit 806, configured to, after the binding unit binds the MA context with the UE contexts, delete the binding relation between the MA context and all UE contexts when receiving an unbinding indication from the MA;

and/or, a second unbinding unit 807, configured to, after the binding unit binds the MA context to the UE context, delete the binding relation between the UE context and the MA context when receiving an unbinding indication from the UE or when a signaling connection is created between the UE and the network side.

The apparatus may further include:

a binding request receiving unit, configured to receive a binding request for binding the UE with the MA; and a binding unit 801, configured to bind the MA context with the UE context after receiving the binding request for binding the UE with the MA.

In the fifth embodiment, the binding unit of the mobility management apparatus binds the MA context to the UE context; the binding success indication sending unit instructs the UE not to send a location update request at the time of location update in order to reduce processing load of the network; and the mobility management apparatus determines that the UE bound with the MA has moved to the corresponding location after receiving the location update request from the MA. Therefore, the location of a moving UE can be determined, without requiring each UE bound with the MA to send a location update request respectively.

A mobility management apparatus according to another embodiment of the present invention includes:

a location update request receiving unit, configured to receive a first location update request sent by an MA; and a location moving determining unit, configured to determine, according to the first location update request and a binding relation between an MA context and a UE context, that a UE moves together with the MA. The binding relation between the MA context and the UE context includes: binding between the UE context and the auxiliary MA context on the MME that the UE registers with, and correlation between the auxiliary MA context and the MA context on the MME that the MA registers with.

Embodiment 6

Figure 9:
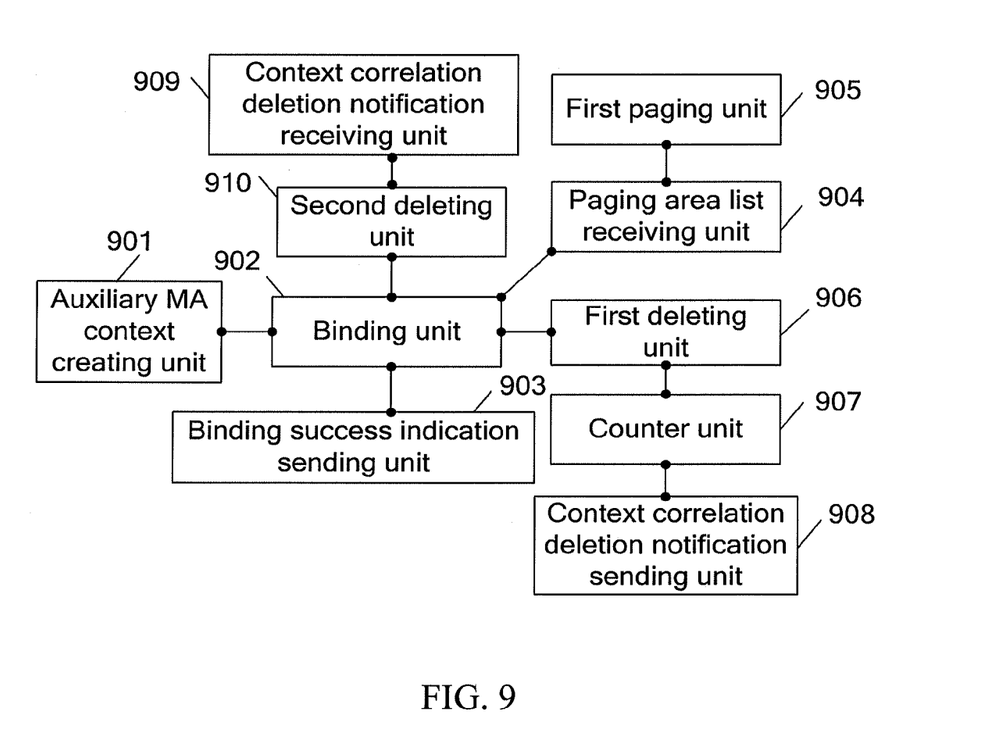
FIG. 9 shows a structure of a mobility management apparatus according to a sixth embodiment of the present invention.

As shown in FIG. 9, a mobility management apparatus is provided according to the sixth embodiment of the present invention. The mobility management apparatus may be an MME with which the UE registers in a multi-host mode, and the apparatus includes:

an auxiliary MA context creating unit 901, configured to create an auxiliary MA context, and correlate the auxiliary MA context with an MA context on a Mobility Management Entity (MME) that an MA registers with;

a binding unit 902, configured to bind a UE context with the auxiliary MA context; and a binding success indication sending unit 903, configured to send a binding success indication to the UE after an auxiliary MA context is created and bound with the UE context in order to instruct the UE not to send a location update request at the time of location update.

Alternatively, the mobility management apparatus may include no binding success indication sending unit 903. Instead, the UE regards the binding as successful if the UE receives no response message within a specific period after sending a binding request, without requiring the mobility management apparatus to send a binding indication indicative success of binding between the MA and the UE to the UE.

The apparatus further includes:

a paging area list receiving unit 904, configured to receive a location update request sent by the MME that the MA registers with after the auxiliary MA context creating unit correlates the auxiliary MA context with the MA context on the MME that the MA registers with, where the location update request carries a new paging area list; and a first paging unit 905, configured to: instruct the RAN to page the UE in the current paging area enumerated in the new paging area list when necessary; or, instruct the RAN to page the UE in the current paging area enumerated in the new paging area list and the cells around the current paging area; or, a second paging unit, configured to: after the binding unit binds the UE context with the auxiliary MA context, send a paging message to the MA through the MME that the MA registers with to instruct the MA to page the UE when the paging is necessary;

a first deleting unit 906, configured to: after the binding unit binds the UE context with the auxiliary MA context, delete the binding relation between the UE context and the auxiliary MA context when receiving an unbinding indication from the UE or when a signaling connection is created between the UE and the network side;

a counter unit 907, configured to decrease the counter of the number of bound UEs by 1 after the first deleting unit deletes the binding relation between the UE context and the auxiliary MA context;

a context correlation deletion notification sending unit 908, configured to send a notification message to the MME that the MA registers with as an instruction of deleting the context correlation when the counter reads 0;

a context correlation deletion notification receiving unit 909, configured to receive the notification message of deleting the context correlation from the MME that the MA registers with; and a second deleting unit 910, configured to: after receiving the notification message of deleting the context correlation, delete the binding between the UE context and the auxiliary MA context and delete the auxiliary MA context.

The apparatus may further include: a binding request receiving unit, configured to receive a binding request for binding the UE with the MA; and a binding unit, configured to bind the UE context with the auxiliary MA context after receiving the binding request for binding the UE with the MA.

In the sixth embodiment, the auxiliary MA context creating unit in the MME creates the auxiliary MA context for the purpose of context correlation with the MME that the MA registers with; the context binding unit binds the UE context with the auxiliary MA context in order to bind the MA with the UE, and instructs the UE not to send a location update request at the time of location update in order to reduce the processing load of the network; and the MME determines that the UE bound with the MA has moved to the corresponding location after receiving the location update request from the MA. Therefore, the location of a moving UE can be determined without requiring each UE bound with the MA to send a location update request respectively.

Embodiment 7

Figure 10:
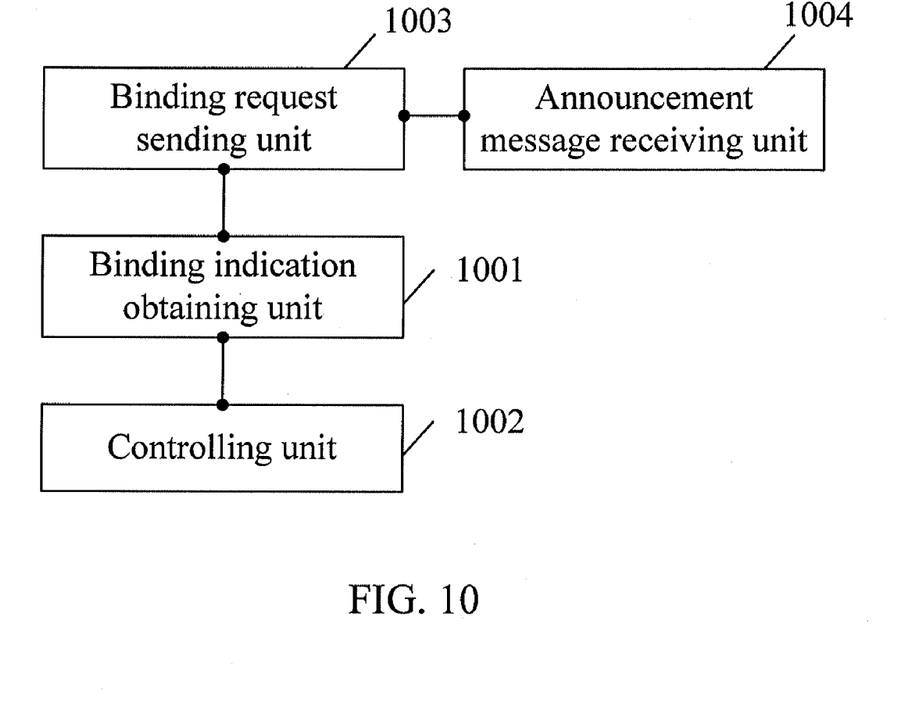
FIG. 10 shows a structure of a UE according to a seventh embodiment of the present invention.

As shown in FIG. 10, a UE is provided according to the seventh embodiment of the present invention. The UE is a mobile terminal, and includes:

a binding indication obtaining unit 1001, configured to obtain a binding indication which indicates success of binding between the UE and the MA; and a controlling unit 1002, configured to, after obtaining the binding indication which indicates success of binding between the UE and the MA, exercise control to refrain from sending a location update request when the UE is moving in the idle state.

Specifically, the binding indication obtaining unit 1001 is configured to receive an indication of success of binding between the UE and the MA from the network side.

The UE may further include a binding request sending unit 1003, which is configured to send a binding request for binding the UE with the MA.

The UE may further include:

an announcement message receiving unit 1004, configured to receive announcement messages sent by multiple MAs which indicate that the corresponding MAs provide mobility agent capabilities; and a selecting unit, configured to select an MA for binding with the UE after the announcement message receiving unit receives the announcement messages from the MAs.

In the seventh embodiment of present invention, while the UE is moving, the UE sends no location update request after obtaining an indication of success of binding between the UE and the MA. Therefore, the network does not need to receive or process masses of location update requests in a very short time, and the processing load of the network is relieved.

Embodiment 8

Figure 11:
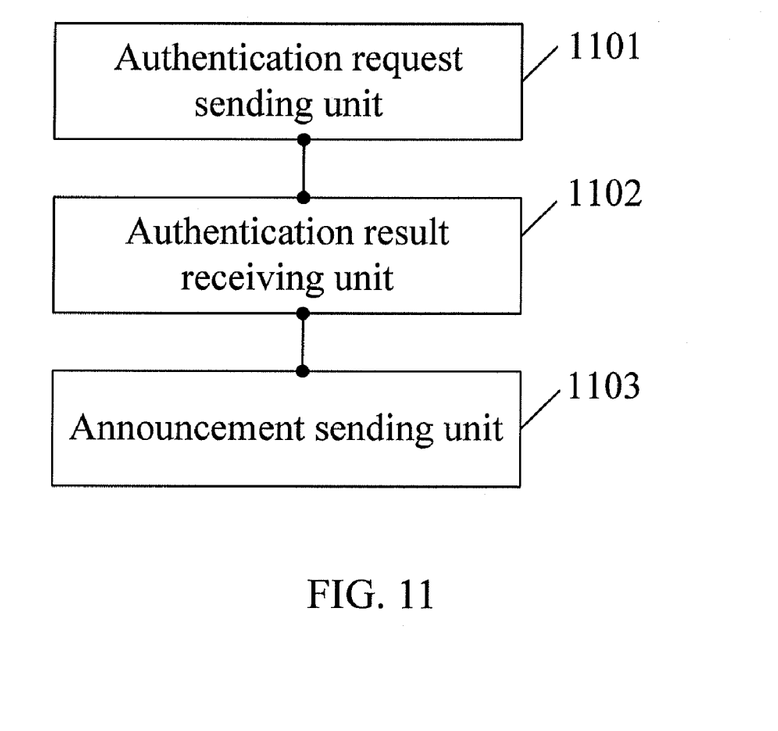
FIG. 11 shows a structure of an MA according to an eighth embodiment of the present invention.

As shown in FIG. 11, an MA according to the eighth embodiment of the present invention includes:

an authentication request sending unit 1101, configured to send an authentication request to a network side to request authorization of mobility agent capabilities;

an authentication result receiving unit 1102, configured to receive an authentication result fed back by the network side; and an announcement sending unit 1103, configured to send an announcement message that carries the authentication result to a UE so that the UE confirms the mobility agent capabilities of the MA.

The MA further includes:

an unbinding indication sending unit, configured to send an unbinding indication to an MME with which the MA registers;

a rebinding indication receiving unit, configured to receive a rebinding indication sent by a new MME with which the MA registers;

a rebinding announcement message sending unit, configured to send a rebinding announcement message; and a paging unit, configured to receive the paging message that carries a UE ID from the MME with which the MA registers, and page the UE according to the paging message.

The MA according to the eighth embodiment acts for the UE in terms of moving.

Embodiment 9

A communication system according to the ninth embodiment of the present invention includes:

an MME that a UE registers with, configured to create an auxiliary MA context, correlate the auxiliary MA context with an MA context on an MME that an MA registers with, and bind a UE context with the auxiliary MA context; and an MME that the MA registers with, configured to create an MA context, correlate the MA context with the auxiliary MA context on the MME that the UE registers with, and receive a location update request sent by the MA; and determine, according to the location update request, that the UE corresponding to the UE context bound with the auxiliary MA context moves together with the MA.

In the ninth embodiment, the MA context is correlated with the auxiliary MA context, and the UE context is bound with the auxiliary MA context so that the MA context is bound with the UE context; after receiving a location update request sent by the MA, the network side determines that the UE bound with the MA has moved to the corresponding location. Therefore, the location of a moving UE can be determined, without requiring each UE bound with the MA to send a location update request respectively, which relieves the processing load of the network.

Persons of ordinary skill in the art understand that all or part of the steps of the method in the embodiments of the present invention may be implemented by a program instructing relevant hardware. The program may be stored in a computer readable storage medium such as ROM/RAM, magnetic disk or CD-ROM.

Expounded above are a mobility management method, relevant devices and a communication system under the present invention. Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A mobility management method, comprising:
   receiving, by a mobility management entity that a mobile agent (MA) registers with, a binding request for binding a user equipment (UE) with the MA from the UE;
   determining whether the UE is registered locally according to addressing information of a current mobility management entity with which the UE registers in the binding request;
   obtaining a UE context locally if the UE is registered locally or obtaining the UE context from the current mobility management entity that the UE registers with if the UE is not registered locally; and
   binding, by the mobility management entity, the obtained UE context with an MA context;
   receiving a first location update request sent by a Mobile Agent (MA); and
   determining, according to the first location update request and a binding relation between the MA context and the User Equipment (UE) context, whether the UE moves together with the MA.

2. The method according to claim 1, wherein:
   the mobility management entity that the MA registers with is a new mobility management entity with which the MA registers;
   before the mobility management entity that the MA registers with receives the binding request from the UE, the method further comprises:
   sending, by the MA, a second location update request;

receiving, by the new mobility management entity that the MA registers with, the second location update request, obtaining the MA context and the UE context from an original mobility management entity that the MA registers with, instructing the original mobility management entity that the MA registers with to clear the binding relation between the MA context and the UE context, and sending a location update accept message that carries a rebinding indication to the MA;

sending, by the MA, a rebinding announcement message that comprises the rebinding indication; and sending, by the UE, a binding request according to the rebinding indication in the rebinding announcement message.

3. The method according to claim 2, wherein: the binding the obtained UE context with the MA context comprises:

binding, by the new mobility management entity that the MA registers with, the obtained UE context with the MA context obtained from the original mobility management entity that the MA registers with.

4. The method according to claim 1, wherein: after binding the MA context with the UE context, the method further comprises one of the following:

instructing, by the mobility management entity that the MA registers with, a Radio Access Network (RAN) to page the UE in a current paging area of the MA;

instructing, by the mobility management entity that the MA registers with, the RAN to page the UE in the current paging area of the MA and cells around the current paging area; and sending, by the mobility management entity that the MA registers with, a paging message that comprises identifier (ID) of the UE to the MA as an instruction of paging the UE.

5. The method according to claim 1, wherein: after binding the MA context to the UE context, the method further comprises one of the following:

deleting, by the mobility management entity that the MA registers with, the binding relation between the MA context and all UE contexts after receiving an unbinding indication sent by the MA;

deleting, by the mobility management entity that the MA registers with, the binding relation between the UE context and the MA context after receiving an unbinding indication sent by the UE; and deleting the binding relation between the UE context and the MA context after a signaling connection is set up between the UE and a network side.

6. The method according to claim 1, wherein: after binding the MA context with the UE context, the method further comprises:

sending, by the mobility management entity that the MA registers with, a binding success indication to the UE as an instruction of sending no location update request at time of location update.

7. The method according to claim 1, wherein the method further comprises:

receiving, by the mobility management entity that the MA registers with, an authentication request from the MA, wherein the authentication request is intended for requesting a network side to authorize mobility agent capabilities;

authenticating, by the mobility management entity that the MA registers with, the MA and returning an authentication result to the MA;

broadcasting, by the MA, an announcement message that comprises the authentication result; and confirming, by the UE, that the MA is authorized with the mobility agent capabilities.

8. A mobility management method, comprising:

creating, by a mobility management entity that a user equipment (UE) registers with, an auxiliary Mobile Agent (MA) context, and correlating the auxiliary MA context with the MA context on an mobility management entity that a MA registers with;

binding a UE context with the auxiliary MA context after receiving the binding request for binding the UE with the MA;

receiving a first location update request sent by the MA; and determining, according to the first location update request and a binding relation between the MA context and the User Equipment (UE) context, whether a UE moves together with the MA.

9. The method according to claim 8, wherein: after receiving the first location update request sent by the MA, the method further comprises one of the following:

allocating, by the mobility management entity that the MA registers with, a new paging area list to the MA, sending a location update request to the mobility management entity that the UE registers with, wherein the location update request comprises the new paging area list, and instructing a Radio Access Network (RAN) to page the UE in a current paging area enumerated in the new paging area list when the mobility management entity that the UE registers with needs to page the UE; and allocating, by the mobility management entity that the MA registers with, a new paging area list to the MA, sending a location update request to the mobility management entity that the UE registers with, wherein the location update request comprises the new paging area list, and instructing the RAN to page the UE in the current paging area enumerated in the new paging area list and cells around the current paging area.

10. The method according to claim 8, wherein: after binding the UE context with the auxiliary MA context, the method further comprises:

sending, by the mobility management entity that the UE registers with, a paging message to the MA through the mobility management entity that the MA registers with, wherein the paging message comprises identifier (ID) of the UE; and paging, by the MA, the UE according to the ID of the UE.

11. The method according to claim 8, wherein: after binding the UE context with the auxiliary MA context, the method further comprises one of the following:

deleting the binding relation between the UE context and the auxiliary MA context after the mobility management entity that the UE registers with receives an unbinding indication from the UE and decreasing a counter of number of UEs bound with the auxiliary MA context by 1; and deleting the binding relation between the UE context and the auxiliary MA context after a signaling connection is created between the UE and a network side, and decreasing a counter of number of UEs bound with the auxiliary MA context by 1.

12. The method according to claim 11, wherein: after decreasing the counter of the number of UEs bound with the auxiliary MA context by 1, the method further comprises:

sending, by the mobility management entity that the UE registers with, a notification message to the mobility management entity that the MA registers with as an instruction of deleting context correlation when the counter reads 0; and deleting, by the mobility management entity that the MA registers with, correlation information of the mobility management entity that the UE registers with from the MA context.

13. The method according to claim 8, wherein: after binding the UE context with the auxiliary MA context, the method further comprises:

sending, by the mobility management entity that the MA registers with, a notification message of deleting context correlation to the mobility management entity that the UE registers with after receiving an unbinding indication from the MA; and deleting, by the mobility management entity that the UE registers with, the binding relation between the auxiliary MA context and the UE context, and deleting the auxiliary MA context.

14. The method according to claim 8, wherein: after correlating the auxiliary MA context with the MA context on the mobility management entity that the MA registers with, the method further comprises:

sending, by the mobility management entity that the UE registers with, a context correlation update message to the mobility management entity that the MA registers with; and determining, by the mobility management entity that the MA registers with, whether the auxiliary MA context exists on the mobility management entity that the UE registers with according to at least one of the following: information in the context correlation update message, and knowing number of UEs bound with the auxiliary MA context on the mobility management entity that the UE registers with according to number of UEs indicated in the context correlation update message.

15. The method according to claim 8, wherein: before receiving the binding request from the UE, the method further comprises:

receiving, by a new mobility management entity that the MA registers with, a second location update request sent by the MA, obtaining the MA context from an original mobility management entity that the MA registers with, and instructing the original mobility management entity that the MA registers with to delete the context correlation; by the original mobility management entity that the MA registers with, sending a notification message of deleting the context correlation to the correlated mobility management entity, wherein the notification message comprises identifier (ID) of the corresponding auxiliary MA context; by the correlated mobility management entity, deleting the binding relation between the auxiliary MA context and the UE context, and deleting the auxiliary MA context;

sending, by the new mobility management entity that the MA registers with, a location update accept message that comprises a rebinding indication to the MA;

sending, by the MA, a rebinding announcement message that comprises the rebinding indication; and sending, by the UE, a binding request according to the rebinding indication in the rebinding announcement message.

16. The method according to claim 8, wherein: after correlating the auxiliary MA context with the MA context on the mobility management entity that the MA registers with, the method further comprises:

sending, by the mobility management entity that the UE registers with, a binding success indication to the UE as an instruction of sending no location update request at time of location update.

17. The method according to claim 8, wherein the method further comprises:

receiving, by the mobility management entity that the MA registers with, an authentication request from the MA, wherein the authentication request is intended for requesting a network side to authorize mobility agent capabilities;

authenticating, by the mobility management entity that the MA registers with, the MA and returning an authentication result to the MA;

broadcasting, by the MA, an announcement message that comprises the authentication result; and confirming, by the UE, that the MA is authorized with the mobility agent capabilities.

18. A mobility management apparatus, comprising:

a location update request receiving unit, configured to receive a first location update request sent by a Mobile Agent (MA);

a location moving determining unit, configured to determine whether a User Equipment (UE) moves together with the MA according to the first location update request and a binding relation between an MA context and a UE context;

a binding unit, configured to bind the MA context with the UE context; and a binding request receiving unit, configured to receive a binding request for binding the UE with the MA, wherein the binding request is sent by the UE;

wherein the binding unit comprises:

a determining unit, configured to determine whether the UE is registered with the mobility management apparatus according to addressing information of a current mobility management entity that the UE registers with after receiving the binding request sent by the UE, wherein the addressing information is carried in the binding request;

a UE context obtaining unit, configured to obtain the UE context from the mobility management apparatus if the determining unit determines that the UE is registered with the mobility management apparatus, and obtain the UE context from the current mobility management entity that the UE registers with if the determining unit determines that the UE is not registered with the mobility management apparatus; and a binding setup unit, configured to bind the UE context obtained by the UE context obtaining unit with the MA context.

19. The apparatus according to claim 18, wherein:

the mobility management apparatus comprises a new mobility management entity with which the MA registers;

the apparatus further comprises:

a rebinding notifying unit, configured to: obtain the MA context and UE context from an original mobility management entity that the MA registers with after receiving a second location update request from the MA, instruct the original mobility management entity that the MA registers with to clear the binding relation between the MA context and the UE context, and send a location update accept message that comprises a rebinding indication to the MA; wherein the binding unit is configured to bind the UE context with the MA context obtained from the original mobility management entity that the MA registers with after receiving the binding request for binding the UE with the MA, wherein the binding request is sent by the UE after the UE obtains the rebinding indication from the MA.

20. The apparatus according to claim 18, further comprising:
   a paging instructing unit, configured to proceed one of the following:
   instruct a Radio Access Network (RAN) to page the UE in a current paging area of the MA when necessary after the binding unit binds the MA context with the UE context;
   instruct the RAN to page the UE in the current paging area of the MA and cells around the current paging area; and
   send a paging message that comprises an identifier (ID) of the UE to the MA in order to instruct the MA to page the UE.

21. The apparatus according to claim 18, further comprising at least one of the following:
   a first unbinding unit, configured to delete the binding relation between the MA context and all UE contexts when receiving an unbinding indication from the MA after the binding unit binds the MA context with the UE contexts; and
   a second unbinding unit, configured to proceed one of the following: delete the binding relation between the UE context and the MA context when receiving an unbinding indication from the UE; and delete the binding relation between the UE context and the MA context when a signaling connection is created between the UE and a network side after the binding unit binds the MA context to the UE context.

22. The apparatus according to claim 18, wherein:
   the binding relation between the MA context and the UE context comprises: binding between the UE context and an auxiliary MA context on the mobility management entity that the UE registers with, and correlation between the auxiliary MA context and the MA context on the mobility management entity that the MA registers with.

* * * * *